UNITED STATES PATENT OFFICE.

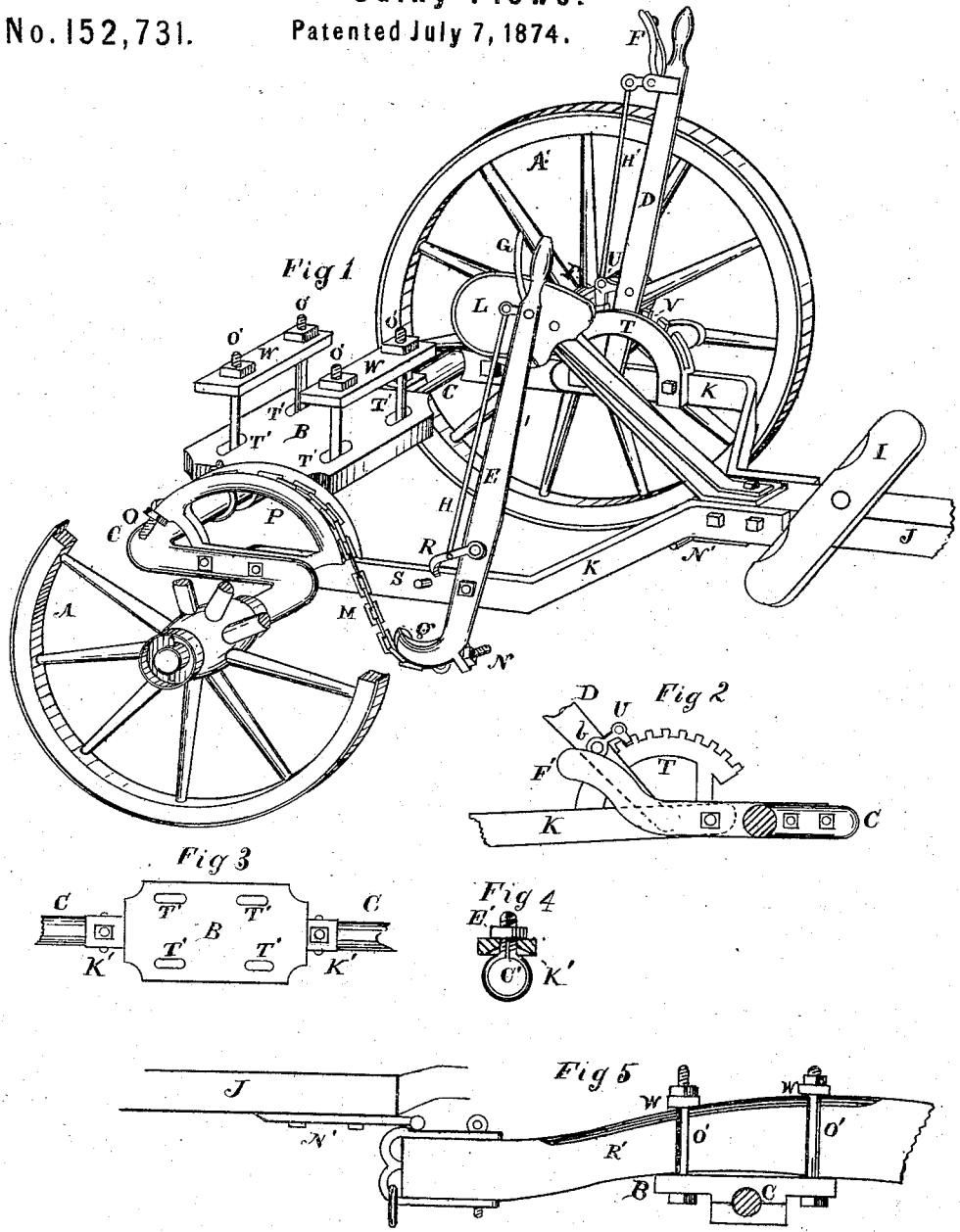

NORMAN DU BOIS, OF GREENVILLE, OHIO.

IMPROVEMENT IN SULKY-PLOWS.

Specification forming part of Letters Patent No. 152,731, dated July 7, 1874; application filed March 13, 1874.

*To all whom it may concern:*

Be it known that I, NORMAN DU BOIS, of Greenville, county of Darke and State of Ohio, have invented certain Improvements in Breaking Sulky-Plows, of which the following is a specification:

My invention relates to an arrangement of hand-levers, whereby the operator may govern the depth of the plow or raise it entirely out of the ground without leaving his seat, the entire management of the team and plow being from the driver's seat, as hereinafter fully described.

Figure 1 is a perspective view of the entire machine, except a part of one wheel. Fig. 2 is a side elevation of the mechanism for governing the depth of the plow. Fig. 3 is a top view of the apparatus which clamps and holds in position the plow-beam. Fig. 4 is a view of the clamp and nut which holds the plate B in position when properly adjusted. Fig. 5 is a view of the plow-beam as attached to the sulky.

A and A' are the wheels, A' being larger than A for the purpose of running in the furrow. B is the plate to which the plow-beam is attached. C is the axle; D, the lever for governing the depth of the plow; E, the lever for throwing the plow out of the ground. L is the driver's seat, and I a foot-board; J, the tongue of the sulky. The manner of attaching and adjusting the plow-beam is shown in Figs. 3 and 5. The beam is placed upon the plate B, having the slots T', the bolts O' being passed through the slots. The clamps W are placed upon the bolts and upon the top of the plow-beam. The adjusting-loops C', Fig. 4, pass around the shaft C and through the stops K', and are held in place by the nut E'. These loops are split through, as shown in Fig. 4, to allow them to be drawn tightly around the shaft or axle C, and hold firmly the stops K', which stops govern the adjustment of plate B sidewise, said plate turning loosely on the axle C. The slots T' in plate B also give additional adjustment to the beam of the plow. The adjustment of plate B sidewise is for the purpose of giving more or less land, according to circumstances, when two or three horses are used. The arm F' is attached to the axle of the sulky, and strikes against the stud-pin b, which pin is attached to the lever D, and serves also as the fulcrum of the pawl U, which pawl is operated by the rod H and latch F, Fig. 1. The toothed arc T is attached to the hounds K, which are attached to the tongue J. When the lever D is thrown forward, as shown in Fig. 2, the pin b strikes against arm F', and holds the plow at a less depth in the ground; but when it is desired for the plow to run deeper, the lever D is thrown back, and consequently the plow goes deeper into the ground. The channeled arc P is also attached to the axle C at the opposite side from the toothed arc T, this arc P being operated through the lever E and chain M, the length of this chain being adjustable through the screw-nuts N and O at its ends. The object of this arrangement is to raise the plow out of the ground independent of the arc T and pawl U, the arcs P and T, with their respective attachments, operating entirely independent of each other; and in case of the point of the plow striking a stone or other obstruction, the axle will rise with the plow independently of both arcs, and without disturbing any other part of the sulky. Thus it will be seen that the plow is confined in the direction of the draft. Yet when the plow strikes an obstruction it can rise without giving an upward motion to any part of the sulky but the axle, which has free play upward when meeting any obstruction. The plow is raised out of the ground by means of the lever E, the foot Q of which pulls upon the chain M when the lever is thrown backward. When the plow is raised, the pawl R drops over the pin S, and holds it out of the ground. When it is desired to lower the plow, the pawl R is raised off the pin S by means of the latch G and rod H. When the plow is in motion the chain M is slack, there being no tension on it, except in raising the plow out of the ground. The curved foot Q of the lever E falls in under the front end of arc P, when the lever is thrown forward and takes up the chain and keeps it out of the way of the pawl R. When the plow is raised the end of the beam strikes against the rest N'.

Having thus fully described my invention, what I claim, and desire to secure by Letters Patent, is—

1. The combination and arrangement of the channeled arc P, chain M, and lever E, having the curved foot Q and pawl R, with pin S, substantially as shown and described, for the purposes specified.

2. The toothed arc T and lever D, having stud $b$ attached to the hound K, in combination with the arm F', attached to the axle C, and with arc P, chain M, and lever E, substantially as shown and described.

Witnesses:     NORMAN DU BOIS.
    CALEB ELLIOTT,
    HARRY DILLE.